March 18, 1924.
A. W. CURTIS
CONVEYER ATTACHMENT
Filed May 18, 1922
1,486,950
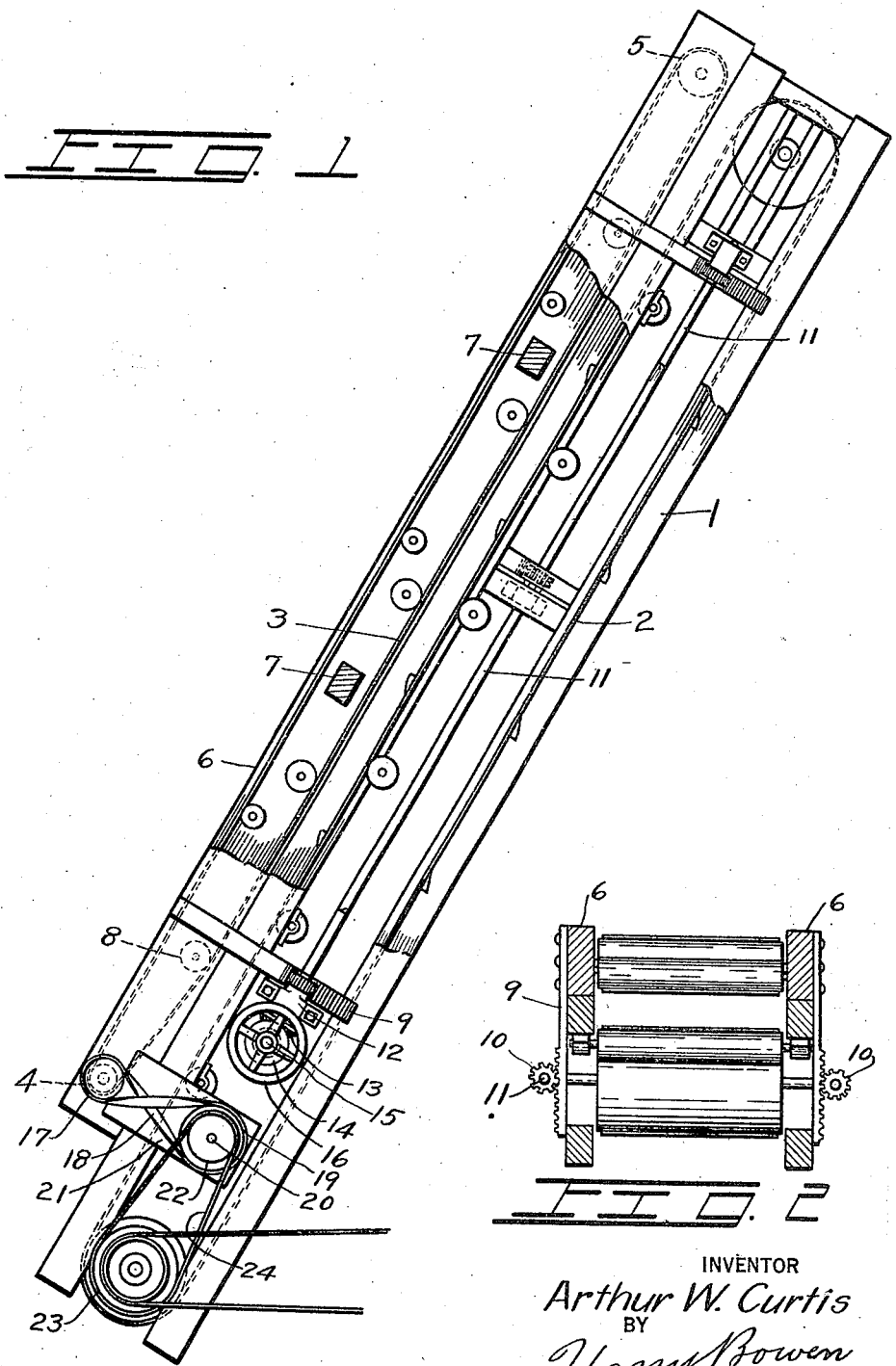
INVENTOR
Arthur W. Curtis
BY
Harry Bowen
ATTORNEY Patented Mar. 18, 1924.

1,486,950

UNITED STATES PATENT OFFICE.

ARTHUR W. CURTIS, OF SEATTLE, WASHINGTON.

CONVEYER ATTACHMENT.

Application filed May 18, 1922. Serial No. 561,874.

*To all whom it may concern:*

Be it known that I, ARTHUR W. CURTIS, a citizen of the United States, residing at Seattle, county of King, and State of Washington, have invented a new and useful Conveyer Attachment; and I do hereby declare that the following is a full, clear, and exact specification, such as will enable others skilled in the art to which it appertains to make and use the same.

The invention is the placing of a small auxiliary conveyer over the main conveyer to prevent objects from sliding back on the conveyer when the outer end of the conveyer is raised.

The object of the invention is to provide a means for preventing objects from sliding back on an inclined conveyer.

Another object of the invention is to provide a small auxiliary conveyer above a main conveyer which may be raised and lowered.

With these ends in view the invention embodies a small conveyer with a suitable frame for supporting it and suitable pulleys and belts for driving it from the head shaft of the main conveyer. The frame has racks projecting from its lower side which mesh with pinions on the sides of the main conveyer so that as the pinions are turned they will move the racks and the auxiliary conveyer upward or downward. The pinions are mounted on shafts on each side of the main conveyer and these are turned thru beveled gears from a common shaft thru the main conveyer which has a hand wheel by which it may be turned on one end. A pulley is placed on the head shaft of the auxiliary conveyer and connected by a cross belt to a pulley on a counter shaft supported on a bracket from the end of the auxiliary conveyer and driven by a pulley from the head shaft of the main conveyer.

Other features and advantages of the invention will appear from the following description, taken in connection with the drawings, wherein;

Figure 1 is a side elevation with part broken away.

Figure 2 is a cross section thru the conveyer.

In the drawings I have shown my device as it may be used wherein numeral 1 indicates the frame of the main conveyer, numeral 2 the belt and numeral 3 the belt of the auxiliary conveyer. The auxiliary conveyer has a head pulley 4 at one end and a tail pulley 5 at the other, both of which are supported in a frame which is constructed of two side members 6 and cross members 7 which hold the sides together. The head shaft upon which the pulley 4 is mounted is raised as shown in Figure 1 in order to form a wider opening at the mouth of the conveyer and the belt is then drawn down to a parallel position by the idler 8. Several of these idlers are placed along the conveyer to prevent the belt from raising away from the main conveyer which would allow objects to fall back down the conveyer. Several small idlers are placed on the under side of the upper belt to prevent its dropping on the lower belt.

Racks 9 are placed on the side of the auxiliary conveyer and project over the main conveyer where they mesh with gears 10 which are mounted on shafts 11 and these are rotatably mounted in bearings 12 on the main conveyer. On the lower ends of the shafts 11 are beveled gears 13 which mesh with other beveled gears 14 on a shaft 15 that crosses thru the center of the conveyer. On the end of shaft 15 is a hand wheel 16 by which it may be turned when it is desired to raise or lower the auxiliary conveyer.

On the head shaft is also a pulley 17 which is driven by a cross belt 18 from a pulley 19 on the counter shaft 20, and the shaft 20, which is mounted in a bracket 21 extending downward from the auxiliary conveyer, is driven by a pulley 22 from a pulley 23 by a belt 24. The pulley 23 is mounted on the head shaft of the main conveyer and the pulley 22 should be in line with it so that as the auxiliary conveyer is raised or lowered the distance between the centers of the pulleys will be only slightly increased. It will be seen that objects may be placed on the conveyer and dumped from it into chutes in the usual manner.

It will be understood that changes may be made in the construction without departing from the spirit of the invention. One of which changes may be in the use of two belts instead of the one as shown. Another may be in the use of guard rails on the inside of the belt at the lower side of the auxiliary conveyer instead of the idlers. Another change may be in the use of a different means for raising and lowering the auxiliary conveyer; and still another may be in the means for driving the auxiliary conveyer from the main conveyer.

The construction will be readily understood from the foregoing description. To use the device it may be attached over a standard conveyer as shown and as the conveyer is operated the lower side of the belt of the auxiliary conveyer will travel in the same direction as the belt on the upper side of the main conveyer and at the same speed. Then as objects are placed on the main conveyer the cleats on it will move the objects upward while the auxiliary conveyer holds them against the main conveyer so it will be absolutely impossible for any object to slide backwards. When changing from cargo of one size to that of another the distance between the two conveyers may be changed by turning the wheel 16.

Having thus fully described the invention what I claim as new and desire to secure by Letters Patent, is:—

A device of the type described embodying a small conveyer in which the pulley at one end is smaller than the pulley at the other and having its axis placed above the center line of the conveyer; racks extending from the sides of the small conveyer to a large conveyer under it where they mesh with pinions on shafts so that as the pinions are turned the racks will move upward or downward; bevel gears on the ends of the shafts meshing with other bevel gears on a shaft going thru the conveyer which has a hand wheel on one end; and a counter shaft rotatably mounted in a bracket extending downward from the auxiliary conveyer having a pulley on it that is driven from a pulley on the main shaft of the large conveyer and another pulley on it which drives a pulley on the end of the small conveyer.

ARTHUR W. CURTIS.